May 24, 1932.  J. WILSON  1,859,906
BRAKE MECHANISM
Filed Aug. 5, 1929
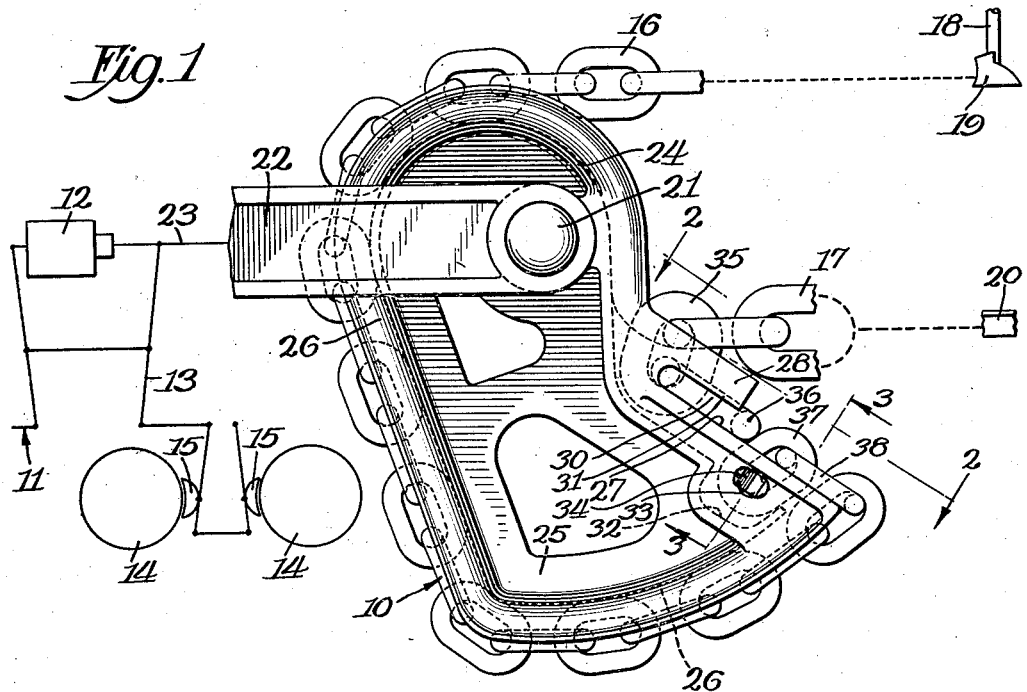
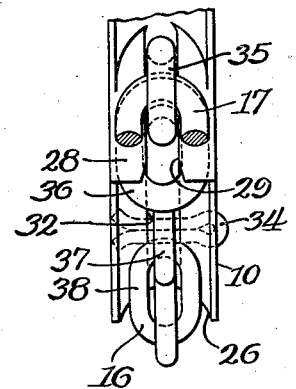
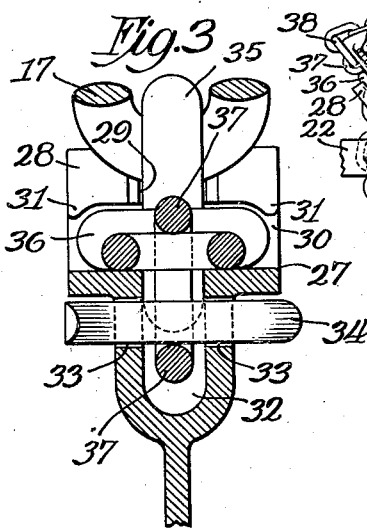
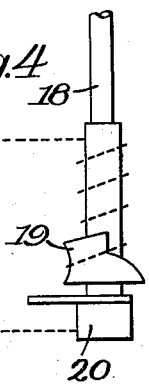
Inventor
Jack Wilson
By Wilson, Mann & Cox, Attys.

Patented May 24, 1932

1,859,906

UNITED STATES PATENT OFFICE

JACK WILSON, OF CHICAGO, ILLINOIS, ASSIGNOR TO UNIVERSAL DRAFT GEAR ATTACHMENT CO., OF CHICAGO, ILLINOIS, A CORPORATION OF ILLINOIS

BRAKE MECHANISM

Application filed August 5, 1929. Serial No. 383,480.

This invention relates to brake mechanism of the type wherein the initial stage of operation effects a quick take-up of slack and is followed by a powerful application of the brakes.

Its principal objects are to reduce the cost of manufacture by using chains or chain sections of different weight, and to provide simple and effective connections between the chains and the sheave or lever device, whereby movement of the brake staff is differentially applied to the brakes in the successive stages of operation.

These objects are accomplished in the embodiment here illustrated by using two chains and a reversible lever having novel means for making driving connections with them.

Other and further objects and advantages will become apparent as the disclosure proceeds and the description is read in conjunction with the accompanying drawings, in which:

Fig. 1 is a semi-diagrammatic front elevational view of a reversible lever constructed in accordance with this invention and associated with conventional forms of foundation brake gear and hand brake mechanism.

Fig. 2 is a fractional, elevational view of the lever taken on the line 2—2 of Fig. 1.

Fig. 3 is a sectional view taken on the line 3—3 of Fig. 1 and looking in the direction of the arrows; and Fig. 4 is a semi-diagrammatic view of the reversible lever in the position assumed when power is being applied to the brakes.

Referring to Fig. 1, the reference character 10 designates generally a reversible lever or cam constructed substantially in accordance with the teachings of the patents to H. I. Wrigley No. 1,567,407 and P. B. Camp et al No. 1,543,470, but which differs from them in that the lever is adapted to be operated by two chains instead of one. The lever 10 is diagrammatically shown in its operative relation to conventional forms of foundation brake gear and hand brakes; the foundation brake gear, generally designated 11, being actuated by the air brake cylinder 12, which imparts movement to the live cylinder lever 13, thereby effecting a braking action on the wheels 14 by pressure of the brake shoes 15 acting through intermediate levers.

Two operating chains, which for convenience will be referred to as the slack chain 16 and the power chain 17, are employed to cooperate with the reversible lever for securing a quick take-up of slack followed by a powerful braking action.

One end of the slack chain 16 is in winding engagement with the brake staff 18 equipped with a drum 19 for guiding the chain upwardly along the staff, and the corresponding end of the power chain 17 is anchored in any suitable manner to some fixed member 20 of the car.

The reversible lever 10 is fulcrumed at 21 to a jaw or yoke 22 which in turn is connected to the foundation brake gear 11 by the hand brake rod 23. The fulcrum 21 divides the lever 10 into a short arm 24 and a long arm 25, the short arm being curved eccentric to the fulcrum 21, and the long arm being somewhat similar to a segment in form. The entire periphery of the lever 10, except for one face, is grooved as at 26 for co-operating with the operating chains. A more detailed description of the peripheral outline of the lever may be found in the patents to Wrigley and Camp, referred to supra, as well as a description of the manner in which the lever operates to accomplish the differential braking action.

The right edge 27 (Fig. 1) of the segment or long arm 25 has a flat surface, and is provided with a projection 28 having a longitudinal or vertical slot 29 and a transverse slot 30. The outer edges of the projection are shouldered as at 31 to form a pocket for a chain link.

Adjacent the end of the projection 28 and in the edge face 27 of the segment or long arm 25 is a recess 32 having a transverse bore 33 in its walls adapted to receive a pin or cotter 34.

In Fig. 1 the reversible lever 10 is shown in the position assumed when the brakes are released, while in Fig. 4 the lever 10 is shown in the position assumed when power is being applied to the brakes. It will be seen that during the first stage of the braking operation when the slack is being taken up, there is relatively little stress on the operating chains, but when the slack has been accounted for and the brakes are being applied (as shown in Fig. 4), the unit stress in the power chain 17 is much greater than that in the slack chain 16 due to the difference in lengths of the two arms of the lever 10. Taking advantage of this difference in unit stress, the slack chain 16 is made up of links of smaller cross section than those in the power chain 17, as shown most clearly in Fig. 3, thereby resulting in a saving in material and resulting in a reduction in the cost of manufacture.

In anchoring the chains 16 and 17 to the lever 10 the two adjacent end links 35 and 36 of the chain 17 are brought into engagement with the projection 28, the link 35 entering the vertical or longitudinal slot 29 and the link 36 entering the transverse slot 30. The shoulder 31 of the projection prevents lateral movement of the link 36 within the transverse slot.

The slack chain 16 (Fig. 1) extends about the reversible lever 10 and the end link 37 falls within the recess 32 in the edge face 27 and is anchored in place by the pin or cotter 34. The adjacent end link 38 rests upon the face 27 and successive links fall within the groove 26 of the periphery of the lever 10.

By this construction, it will be seen that the end link 37 anchored to the lever 10 in the recess 32 abuts against and securely locks the link 36 of the power chain 17 in the projection 28, thus providing a simple, yet strong, durable and efficient means for interlocking the operating chains to the cam lever.

It will be noticed that one of the cardinal advantages of this novel anchor construction rests in the fact that the cotter or pin 34 carries but a small portion of the actual stress acting upon the lever 10 through the chains 16 and 17.

No exact analysis of the distribution of stresses need be indulged in for it will readily be seen that the tension in the chain 17 is carried largely by the projection 28 assisted, at certain stages of the braking operation, by a downward pressure (Fig. 1) of the link 36 upon the link 37, while the tension in the chain 16, when at its maximum (Fig. 4) is principally carried by the edge 27 and the projection 28 through a lever action of the link 37 against the link 36.

Although the reversible lever here described has been designed to reduce manufacturing cost by the employment of two chains of different weight and strength, it is obvious that a single chain may be employed, if desired, in place of the slack chain 16 and the power chain 17, in which case the link 37 instead of abutting the link 36 would be interiorly engaged therewith.

It will, of course, be understood that various changes and modifications can be made in the selected embodiment herein described for the purpose of illustration, without departing from the spirit of the invention as expressed in the appended claims forming a part hereof.

What I claim is:

1. In brake mechanism for railway cars and the like, a reversible lever fulcrumed to form a long arm and a short arm, a projection on one edge face and having open slots at substantially right angles to each other to receive adjacent links of an operating chain, and a recess in the periphery of the said face to receive the end link of a second operating chain, said last chain cooperating with the first to hold the latter within the slotted projection.

2. In a brake mechanism for railway cars and the like, a reversible lever having a projection on one edge face thereof, said projection having longitudinal and transverse slots for detachably engaging the adjacent end links of a relatively heavy power chain, a recess in the periphery of the said face and adjacent the end of the projection for receiving the end link of a relatively light slack chain, and means for anchoring the said end link in the recess, said end link serving to lock the adjacent end links of the first named chain in the slots of the projection.

3. In a brake mechanism, a reversible lever, a projection on one face slotted to receive adjacent links of an operating chain, and means for locking said links in place by a second operating chain anchored to the lever.

4. In a brake mechanism, a reversible lever having a groove in its periphery to receive an operating chain, means associated with said groove for exteriorly engaging a link of the operating chain, and means comprising an abutting link of a second chain for preventing disengagement of the first named chain.

5. In a brake mechanism, a reversible lever having associated therewith two operating chains of different weight and strength, one of said chains being engaged in a slotted projection, the other being anchored to the periphery of the lever and locking the first chain within the projection.

6. In a brake mechanism for railway cars, a reversible lever having a grooved periphery, a projection on one edge face of the lever having open longitudinal and transverse slots, a recess in said face adjacent the end of said projection, a power chain associated with the grooved periphery and having its adjacent end links engaged in the slotted projection, and a slack chain associated with the grooved periphery and anchored in the said recess, the end link of said slack chain abutting the end link of the power chain and preventing its disengagement from the projection.

7. In a brake mechanism, a reversible lever having a relatively deep link-receiving recess in an edge face of its periphery, a projection on said face adjacent the recess and having longitudinal and transverse slots, said recess and said projection comprising means for anchoring an operating chain to the said lever.

8. A single sheave reversible lever for use in brake mechanism having a projection on one edge face slotted longitudinally and transversely, and a relatively deep link-receiving recess in said face adjacent the end of the projection.

In testimony whereof I affix my signature.

JACK WILSON.